United States Patent
Kim

(10) Patent No.: US 7,255,358 B2
(45) Date of Patent: Aug. 14, 2007

(54) AIR SUSPENSION SYSTEM FOR VEHICLE

(75) Inventor: Han Soo Kim, Kyunggi-do (KR)

(73) Assignee: Hyundai Mobis Co., Ltd., Yongin-Shi (KR)

( * ) Notice: Subject to any disclaimer, the term of this patent is extended or adjusted under 35 U.S.C. 154(b) by 415 days.

(21) Appl. No.: 10/939,329

(22) Filed: Sep. 14, 2004

(65) Prior Publication Data

US 2006/0017250 A1 Jan. 26, 2006

(30) Foreign Application Priority Data

Jul. 22, 2004 (KR) ...................... 10-2004-0057091

(51) Int. Cl.
*B60G 11/27* (2006.01)
(52) U.S. Cl. ........................... 280/124.16; 280/124.157
(58) Field of Classification Search ........... 280/124.16, 280/124.161, 124.157, 5.5, 6.15
See application file for complete search history.

(56) References Cited

U.S. PATENT DOCUMENTS

| | | | | |
|---|---|---|---|---|
| 6,845,988 | B2 * | 1/2005 | Romer et al. | 280/5.514 |
| 6,874,772 | B2 * | 4/2005 | Oldenettel | 267/64.28 |
| 7,032,895 | B2 * | 4/2006 | Folchert | 267/64.28 |

* cited by examiner

*Primary Examiner*—Eric Culbreth
(74) *Attorney, Agent, or Firm*—Greenblum & Bernstein, P.L.C.

(57) ABSTRACT

An air suspension system includes an air tank, an air drier, a compressor, and an air spring, which are sequentially provided in a first line. The air suspension system further includes a second line, a third line, an intake line, and a discharge line, which are connected to the first line. The first line, the second line and the third lines can be switched by a 4-port/2-position solenoid valve, and the first line is selectively connected to the intake line by a 3-port/2-position solenoid valve.

18 Claims, 5 Drawing Sheets

AIR SUSPENSION SYSTEM FOR VEHICLE

BACKGROUND OF THE INVENTION

1. Field of the Invention

The present invention relates to an air suspension system for a vehicle, and more particularly to an air suspension system for a vehicle designed to allow air to circulate in a closed circuit between an air tank and a spring.

2. Description of the Related Art

FIG. 1 is a circuit diagram of a conventional air suspension system for a vehicle.

The conventional air suspension system for the vehicle serves to allow air in an air tank 2 to be supplied to an air spring 6, or to allow air to be withdrawn from the air spring 6 to the air tank 2 by means of a compressor 4 via several valve means 10 provided among the air tank 2, the compressor 4, and the air spring 6, respectively. Furthermore, the air suspension system allows outside air to be added to the air tank 2 or allows air in the air tank 2 to be discharged to the outside via the valve 10.

Meanwhile, an air drier 12 to dry air is equipped in a line through which outside air is introduced or discharged, and a pressure sensor 14 to measure the pressure of the air tank 2 or of the air spring 6 is equipped in a line through which air circulates between the air tank 2 and the air spring 6.

However, in the conventional air suspension system for the vehicle disclosed above, the air tank 2 and the air spring 6 are not connected to each other by means of an in-line structure, and the line through which air flows is complicatedly entangled. As a result, there occur problems of a large air pressure loss and of low responsiveness.

Additionally, the conventional air suspension system has the air drier 12 exposed to the outside, so that even when air is not added to the air tank 2, outside air is always introduced into the air drier 12. As a result, there occur problems in that the air drier 12 has a large volume, and in that the air drier 12 is excessively operated, causing ineffective operation of the air drier 12.

SUMMARY OF THE INVENTION

The present invention has been made to solve the above problems, and it is an object of the present invention to provide an air suspension system for a vehicle designed to minimize loss of air pressure, to enhance responsiveness, and to enhance efficiency of an air drier.

In accordance with an aspect of the present invention, the above and other objects can be accomplished by the provision of an air suspension system for a vehicle, comprising: a first line provided between an air tank and an air spring; a first valve means, an air drier, a compressor to discharge pneumatic air towards the air tank, a second valve means, and an air spring-opening/closing valve, sequentially equipped from the air tank on the first line; and second and third lines provided between the first valve means and the second valve means, wherein, when applying air pressure, air in the air tank is supplied from the air tank to the air spring through the first valve means, the second line, the second valve means, the compressor, the air drier, the first valve means, the third line, the second valve means, and the air spring-opening/closing valve, and when releasing the air pressure, air in the air spring is transmitted and then contained in the air tank through the air spring-opening/closing valve, the second valve means, the compressor, the air drier, and the first valve means.

The air suspension system may further comprise a pressure meter equipped between the compressor and the second valve means on the first line, so that when measuring a pressure of the air tank, air in the air tank is transmitted from the air tank to the pressure meter through the first valve means, the second line, and the second valve means, and so that when measuring the pressure of the air spring, air in the air spring is transmitted from the air spring to the pressure meter through the air spring-opening/closing valve and the second valve means.

The first valve means may be a 4-port/2-position solenoid valve, allowing the air tank to be directly connected to the air drier when being switched to a first position, and allowing the air tank to be connected to the second line while allowing the air drier to be connected to the third line when being switched to a second position.

The second valve means may be a 4-port/2-position solenoid valve, allowing the compressor to be directly connected to the air spring-opening/closing valve when being switched to a first position, and allowing the second line to be connected to the compressor while allowing the third line to be connected to the air spring-opening/closing valve when being switched to a second position.

The air suspension system may further comprise an intake line connected to the first line between the compressor and the second valve means, an intake valve equipped on the intake line, and a third valve means equipped between the first line and the intake line, so that when intaking outside air, the outside air is added from the outside to the air tank through the intake valve, the intake line, the third valve means, the compressor, the air drier, and the first valve means. Additionally, the air suspension system may further comprise a discharge line connected to the first line between the air drier and the compressor, and a discharge valve equipped on the discharge line, so that when discharging air to the outside, air is discharged from the air tank to the outside through the first valve means, the air drier, the discharge line, and the discharge valve.

Here, the third valve means may be a 3-port/2-position solenoid valve, allowing the compressor to be connected to the pressure meter when being switched to a first position, and allowing the compressor to be connected to the intake line when being switched to a second position.

BRIEF DESCRIPTION OF THE DRAWINGS

The foregoing and other objects and features of the present invention will be more clearly understood from the following detailed description taken in conjunction with the accompanying drawings, in which.

DESCRIPTION OF THE PREFERRED EMBODIMENTS

Embodiments of an air suspension system for a vehicle according to the present invention will now be described in detail with reference to the accompanying drawings.

Although various embodiments of the air suspension system for the vehicle according to the present invention can be provided, a most preferred embodiment will be described in the specification. Since a basic configuration of the air suspension system for the vehicle is the same as that of the conventional air suspension system described above, detailed description thereof will be omitted.

Figure 1:
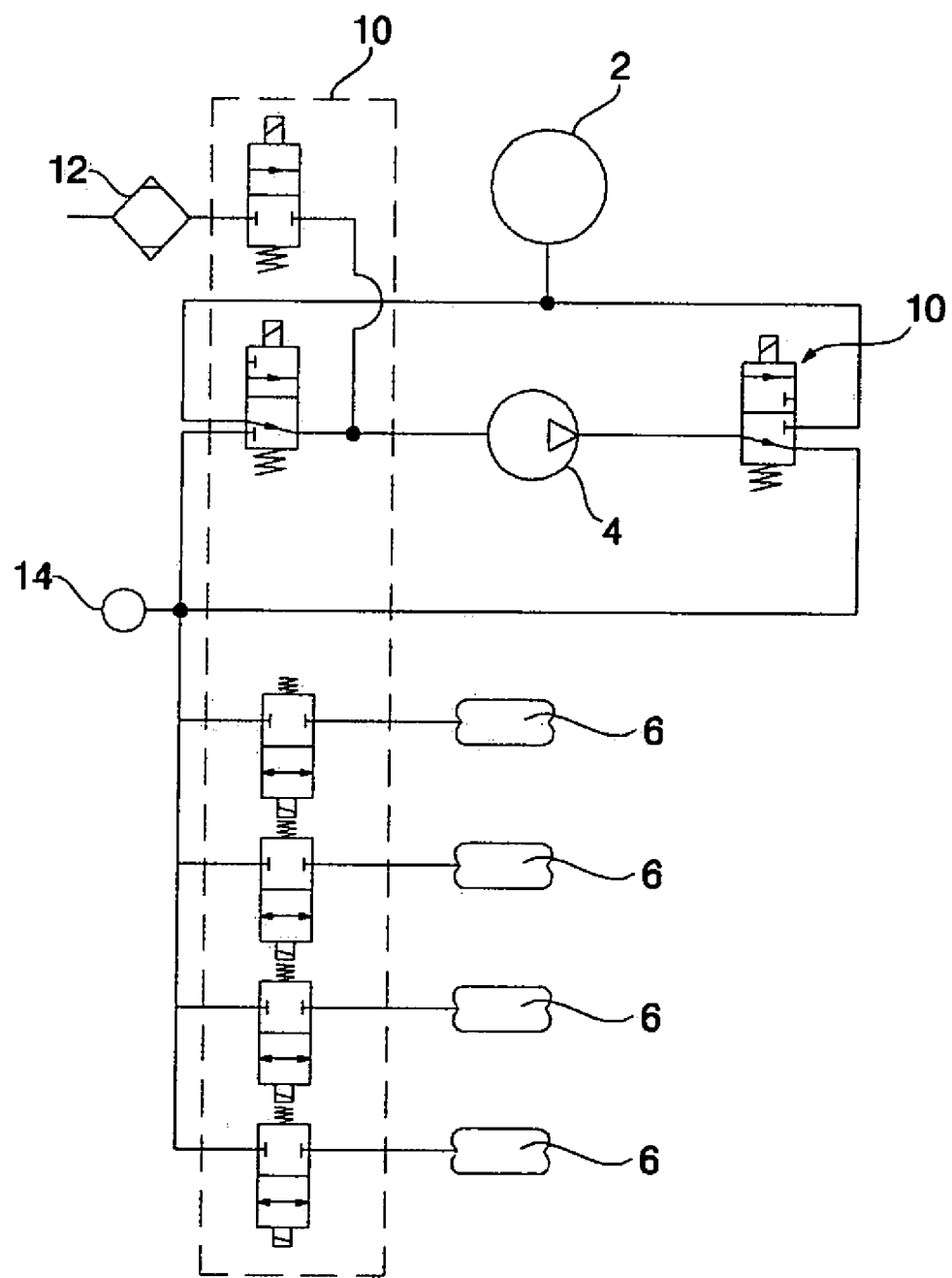
FIG. 1 is a circuit diagram of a conventional air suspension system for a vehicle.
Figure 2:
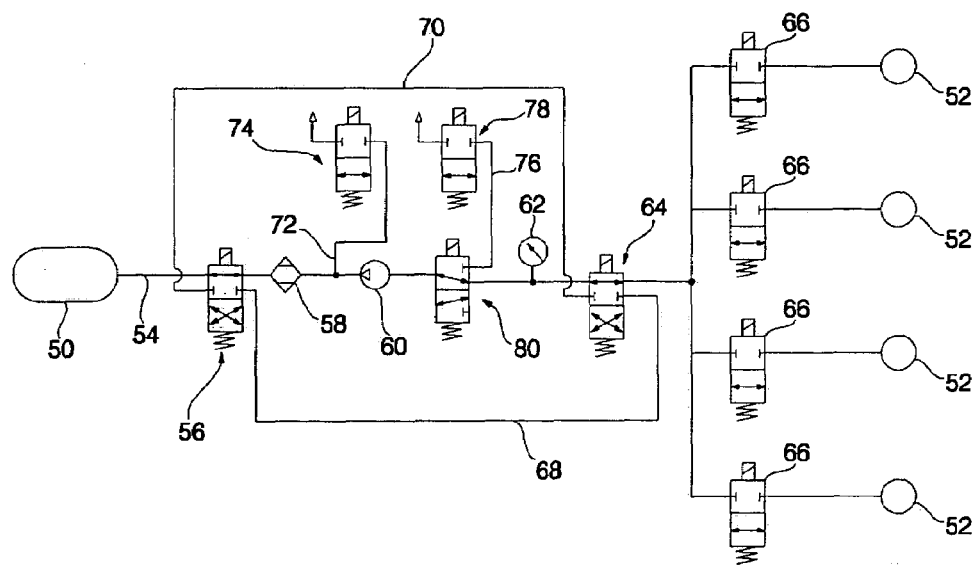
FIG. 2 is a circuit diagram of an air suspension system for a vehicle according to the present invention.

FIG. 2 is a circuit diagram of an air suspension system for a vehicle according to the present invention.

An air suspension system for a vehicle according to the present invention comprises: a first line 54 provided between an air tank 50 and an air spring 52; a first valve means 56, an air drier 58, a compressor 60, a pressure meter 62, a second valve means 64, and an air spring-opening/closing valve 66, sequentially equipped from the air tank 50 on the first line 54; and second and third lines 68 and 70 provided between the first valve means 56 and the second valve means 64.

The first valve means 56 is a 4-port/2-position solenoid valve, allowing the air tank 50 to be directly connected to the air drier 58 while disconnecting the second and third lines 68 and 70 from each other when being switched to a first position, and allowing the air tank 50 to be connected to the second line 68 while allowing the air drier 58 to be connected to the third line 70 when being switched to a second position.

The compressor 60 is a unidirectional compressor, which supplies air flowing towards the air tank 50 after compressing the air to a predetermined pressure.

The second valve means 64 is a 4-port/2-position solenoid valve, allowing the pressure meter 62 to be directly connected to the air spring-opening/closing valve 66 while disconnecting the second and third lines 68 and 70 from each other when being switched to a first position, and allowing the second line 68 to be connected to the compressor 60 while allowing the third line 70 to be connected to the air spring-opening/closing valve 66 when being switched to a second position.

The air spring-opening/closing valve 66 is a 2-port/2-position solenoid valve, which does not allow air to be introduced into or discharged from the air spring 52 when being switched to a first position while allowing air to be introduced into or discharged from the air spring 52 when being switched to a second position.

Meanwhile, the first line 54 is connected to a discharge line 72 between the air drier 58 and the compressor 60 such that air in the air tank 50 can be discharged to the outside. The discharge line 72 is provided with a discharge valve 74 to open/close the discharge line 72. The discharge valve 74 is a 2-port/2-position solenoid valve, which closes the discharge line 72 when being switched to a first position while opening the discharge valve 74 when being switched to a second position.

Furthermore, the first line 54 is connected to an intake line 76 between the compressor 60 and the pressure meter 62 such that outside air can be added to the air tank 50. The intake line 76 is also provided with an intake valve 78 to open/close the intake line 76. The intake line 76 is also a 2-port/2-position solenoid valve, which closes the intake line 76 when being switched to a first position while opening the intake line 76 when being switched to a second position.

A third valve means 80 is equipped between the first line 54 and the intake line 76 in order to selectively connect the first line 54 and the intake line 76. The third valve means is a 3-port/2-position solenoid valve, allowing the compressor 60 to be connected to the pressure meter 62 while disconnecting the first line 54 and the intake line 76 from each other when being switched to a first position, and allowing the first line 54 to be connected to the intake line 76 while disconnecting the compressor 60 and the pressure meter 62 from each other when being switched to a second position.

Operation of the air suspension system according to the present invention will be described hereinafter.

Figure 3:
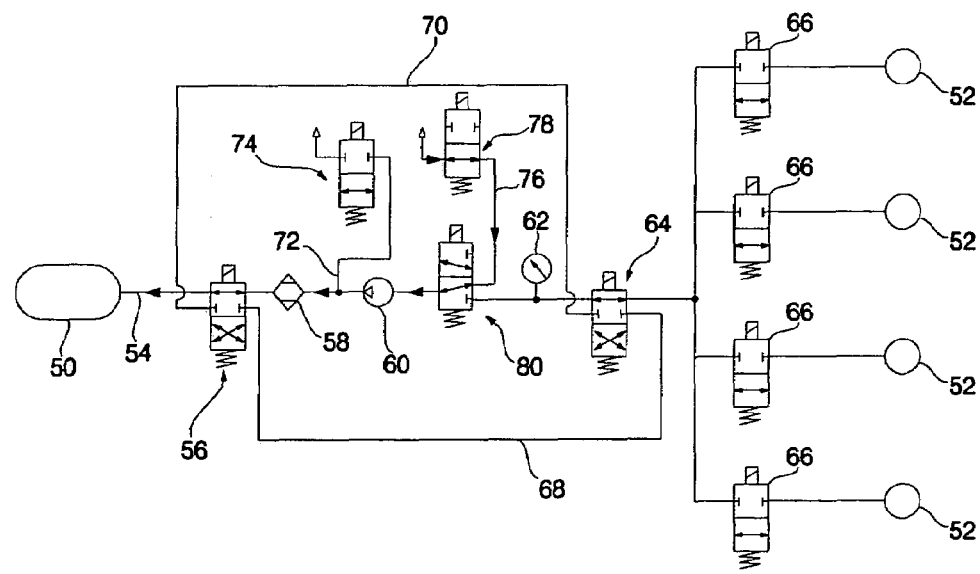
FIG. 3 is a circuit diagram illustrating an intake operation of the air suspension system for the vehicle according to the present invention.

FIG. 3 is a circuit diagram illustrating an intake operation to add outside air to the air tank 50.

The first valve means 56 is switched to the first position, the third valve means 80 is switched to the second position, the intake valve means 78 is switched to the second position, and the discharge valve means 74 is switched to the first position. Then, as indicated by an arrow, outside air is introduced from the outside into the air tank 50 through the intake line 76, the third valve means 80, the compressor 60, the air drier 58, and the first valve means 56, sequentially.

At this time, the outside air is compressed to a predetermined pressure by the compressor 60, and dried below a predetermined degree of dryness in the air drier 58.

Figure 4:
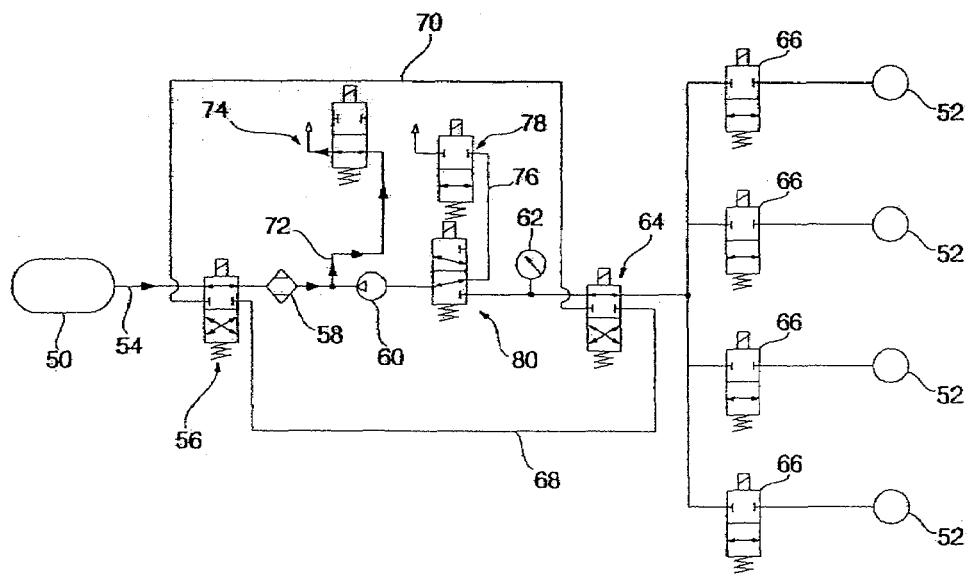
FIG. 4 is a circuit diagram illustrating a discharge operation of the air suspension system for the vehicle according to the present invention.

FIG. 4 is a circuit diagram illustrating a discharge operation to discharge air of the air tank 50 to the outside.

The first valve means 56 is switched to the first position, the third valve means 80 is switched to the second position, the intake valve means 78 is switched to the first position, and the discharge valve means 74 is switched to the second position. Then, as indicated by an arrow, air in the air tank 50 is discharged to the outside through the first valve means 56, the air drier 58, the discharge line 72, and the discharge valve 74.

Except when discharging or intaking the outside air, the discharge valve 74 and the intake valve 78 always close the discharge line 72 and the intake line 76, respectively.

Figure 5:
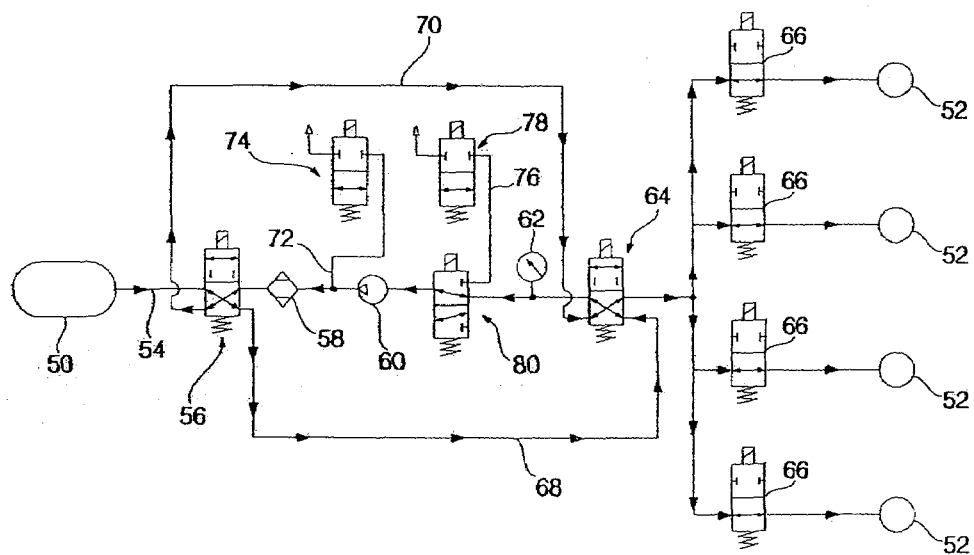
FIG. 5 is a circuit diagram illustrating air pressure applying operation of the air suspension system for the vehicle according to the present invention.

FIG. 5 is a circuit diagram illustrating a supply operation to supply air in the air tank 50 to the air spring 52.

The first valve means 56 is switched to the second position, the second valve means 64 is switched to the second position, the third valve means 80 is switched to the first position, and the air spring-opening/closing valve 66 is switched to the second position. Then, as indicated by the arrow, air in the air tank 50 is discharged from the air tank 50 to the air spring 52 through the first valve means 56, the second line 68, the second valve means 64, the third valve means 80, the compressor 60, the air drier 58, the first valve means 56, the third line 70, the second valve means 64, and the air spring-opening/closing valve 66. When air is supplied to the air spring 52, the air spring 52 is inflated.

Figure 6:
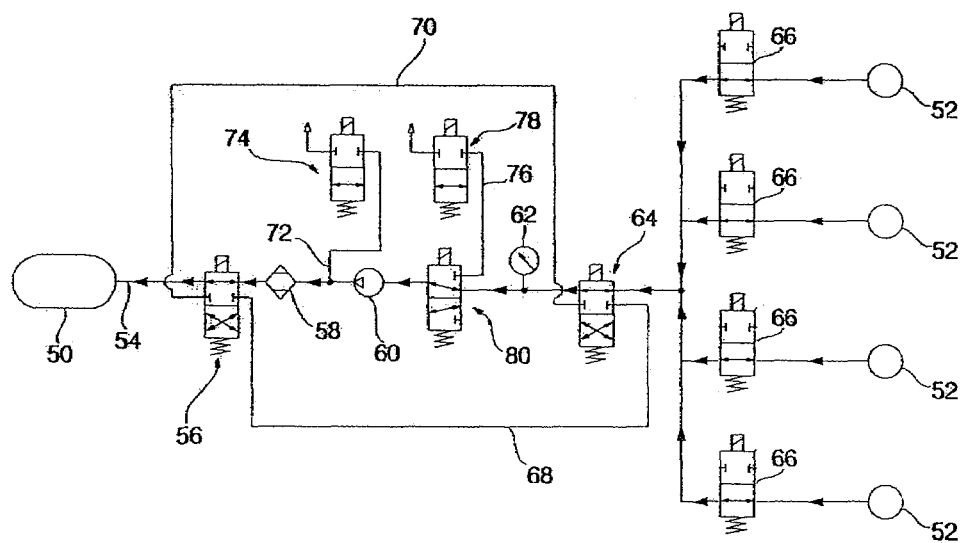
FIG. 6 is a circuit diagram illustrating air pressure releasing operation of the air suspension system for the vehicle according to the present invention.

FIG. 6 is a circuit diagram illustrating a withdrawing operation to withdraw air from the air spring 52 to the air tank 50.

The first valve means 56 is switched to the first position, the second valve means 64 is switched to the first position, the third valve means 80 is switched to the first position, and the air spring-opening/closing valve 66 is switched to the second position. Then, as indicated by the arrow, air in the air spring 52 is withdrawn to the air tank 50 through the air spring-opening/closing valve 66, the second valve means 64, the compressor 60, the air drier 58, and the first valve means 56. At this time, as air in the air spring is discharged from the air spring 52 to the air tank 50, the air spring 52 is deflated.

Figure 7:
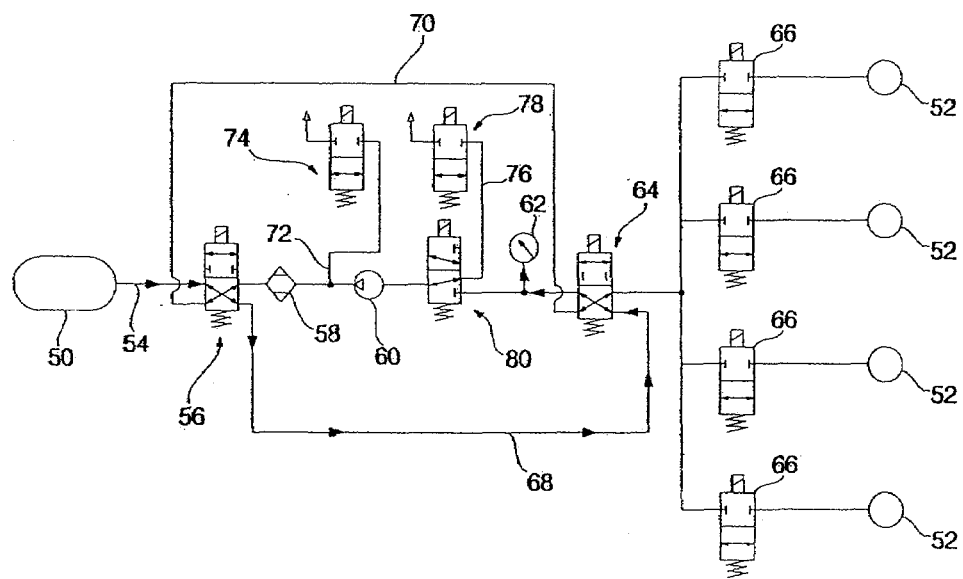
FIG. 7 is a circuit diagram illustrating a pressure measuring operation to measure the pressure of an air tank of the air suspension system for the vehicle according to the present invention.

FIG. 7 is a circuit diagram illustrating a pressure measuring operation to measure the pressure in the air tank 50.

The first valve means 56 is switched to the second position, the second valve means 64 is switched to the second position, the third valve means 80 is switched to the second position, and the air spring-opening/closing valve 66 is switched to the first position. Then, as indicated by the arrow, air in the air tank 50 is transmitted to the pressure meter 62 through the first valve means 56, the second line 68, and the second valve means 64, and the pressure of the air tank 50 is then measured by the pressure meter 62.

Figure 8:
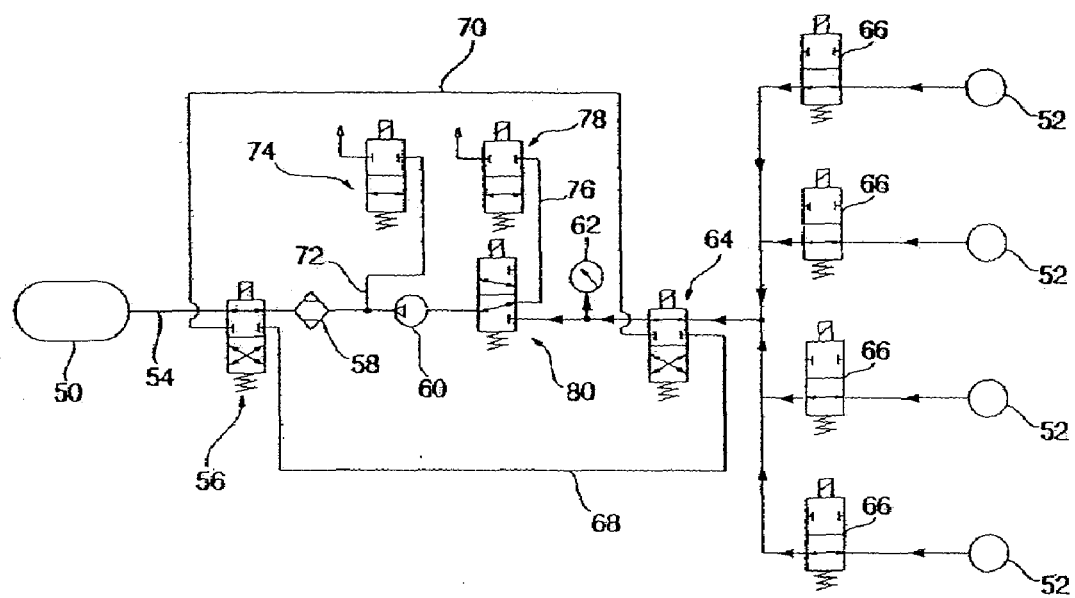
FIG. 8 is a circuit diagram illustrating another pressure measuring operation to measure the pressure of an air spring of the air suspension system for the vehicle according to the present invention.

FIG. 8 is a circuit diagram illustrating another pressure measuring operation to measure the pressure in the air spring 52.

The second valve means 64 is switched to the first position, the third valve means 80 is switched to the second position, and the air spring-opening/closing valve 66 is switched to the second position. Then, as indicated by the arrow, air in the air spring 52 is transmitted up to the pressure meter 62 through the air spring-opening/closing valve 66 and the second valve means 64, and the pressure of the air spring 52 is then measured by the pressure meter 62.

As apparent from the description, the air suspension system according to the present invention is designed to allow the air drier 58 to contact the outside air only during an intake operation, so that the air suspension system can be minimized, exhibit sufficient performance, and so that the compressor 60 can be provided as a unidirectional compressor, allowing the compressor to be operated only in one direction.

Furthermore, the line, through which air flows, between the air tank 50 and the air spring 52 has a relatively short length, thereby minimizing the air pressure loss, and enhancing responsiveness.

Furthermore, the pressure of the air tank 50 and of the air spring 52 can be independently measured.

It should be understood that the embodiments and the accompanying drawings as described above have been described for illustrative purposes and the present invention is limited by the following claims. Further, those skilled in the art will appreciate that various modifications, additions and substitutions are allowed without departing from the scope and spirit of the invention as set forth in the accompanying claims.

What is claimed is:

1. An air suspension system for a vehicle, comprising:
    a first line provided between an air tank and an air spring;
    a first valve, an air drier, a compressor to discharge pneumatic air towards the air tank, a second valve, and an air spring-opening/closing valve, which are sequentially provided in the first line; and second and third lines provided between the first valve and the second valve,
    wherein when applying air pressure, air in the air tank is supplied from the air tank to the air spring through the first valve, the second line, the second valve, the compressor, the air drier, the first valve, the third line, the second valve, and the air spring-opening/closing valve, and when releasing the air pressure, air in the air spring is transmitted and then contained in the air tank through the air spring-opening/closing valve, the second valve, the compressor, the air drier, and the first valve.

2. The air suspension system as set forth in claim 1, further comprising a pressure meter equipped between the compressor and the second valve on the first line, so that when measuring a pressure of the air tank, air in the air tank is transmitted from the air tank to the pressure meter through the first valve, the second line, and the second valve, and so that when measuring a pressure of the air spring, air in the air spring is transmitted from the air spring to the pressure meter through the air spring-opening/closing valve and the second valve.

3. The air suspension system as set forth in claim 2, further comprising an intake line connected to the first line between the compressor and the pressure meter, an intake valve equipped on the intake line, a third valve equipped between the first line and the intake line, a discharge line connected to the first line between the air drier and the compressor, and a discharge valve equipped on the discharge line, so that when intaking outside air, the outside air is added from the outside to the air tank through the intake line, the third valve, the compressor, the air drier, and the first valve, and so that when discharging air to the outside, air is discharged from the air tank to the outside through the first valve, the air drier, and the discharge line.

4. The air suspension system as set forth in claim 3, wherein the first valve is a 4-port/2-position solenoid valve, allowing the air tank to be directly connected to the air drier while disconnecting the second and third lines from each other when being switched to a first position, and allowing the air tank to be connected to the second line while allowing the air drier to be connected to the third line when being switched to a second position.

5. The air suspension system as set forth in claim 4, wherein the second valve is a 4-port/2-position solenoid valve, allowing the pressure meter to be directly connected to the air spring-opening/closing valve while disconnecting the second and third lines from each other when being switched to a first position, and allowing the pressure meter to be connected to the second line while allowing the air spring-opening/closing valve to be connected to the third line when being switched to a second position.

6. The air suspension system as set forth in claim 5, wherein the third valve is a 3-port/2-position solenoid valve, allowing the compressor to be connected to the pressure meter when being switched to a first position, and allowing the compressor to be connected to the intake line when being switched to a second position.

7. The air suspension system as set forth in claim 6, wherein the air spring-opening/closing valve, the intake valve, and the discharge valve are 2-port/2-position solenoid valves, respectively.

8. The air suspension system as set forth in claim 3, wherein the second valve is a 4-port/2-position solenoid valve, allowing the pressure meter to be directly connected to the air spring-opening/closing valve while disconnecting the second and third lines from each other when being switched to a first position, and allowing the pressure meter to be connected to the second line while allowing the air spring-opening/closing valve to be connected to the third line when being switched to a second position.

9. The air suspension system as set forth in claim 3, wherein the third valve is a 3-port/2-position solenoid valve, allowing the compressor to be connected to the pressure meter when being switched to a first position, and allowing the compressor to be connected to the intake line when being switched to a second position.

10. The air suspension system as set forth in claim 3, wherein the air spring-opening/closing valve, the intake valve, and the discharge valve are 2-port/2-position solenoid valves, respectively.

11. The air suspension system as set forth in claim 1, further comprising an intake line connected to the first line between the compressor and the second valve, an intake valve equipped on the intake line, a third valve equipped between the first line and the intake line, a discharge line connected to the first line between the air drier and the compressor, and a discharge valve equipped on the discharge line, so that when intaking outside air, the outside air is added from the outside to the air tank through the intake line, the third valve, the compressor, the air drier, and the first valve, and so that when discharging air to the outside, air is discharged from the air tank to the outside through the first valve, the air drier, and the discharge line.

12. The air suspension system as set forth in claim 11, wherein the first valve is a 4-port/2-position solenoid valve, allowing the air tank to be directly connected to the air drier when being switched to a first position, and allowing the air tank to be connected to the second line while allowing the air drier to be connected to the third line when being switched to a second position.

13. The air suspension system as set forth in claim 12, wherein the second valve is a 4-port/2-position solenoid valve, allowing the compressor to be directly connected to the air spring-opening/closing valve when being switched to a first position, and allowing the second line to be connected to the compressor while allowing the third line to be connected to the air spring-opening/closing valve when being switched to a second position.

14. The air suspension system as set forth in claim 13, wherein the third valve is a 3-port/2-position solenoid valve, allowing the compressor to be connected to the pressure meter when being switched to a first position, and allowing the compressor to be connected to the intake line when being switched to a second position.

15. The air suspension system as set forth in claim 11, wherein the second valve is a 4-port/2-position solenoid valve, allowing the compressor to be directly connected to the air spring-opening/closing valve when being switched to a first position, and allowing the second line to be connected to the compressor while allowing the third line to be connected to the air spring-opening/closing valve when being switched to a second position.

16. The air suspension system as set forth in claim 11, wherein the third valve is a 3-port/2-position solenoid valve, allowing the compressor to be connected to the pressure meter when being switched to a first position, and allowing the compressor to be connected to the intake line when being switched to a second position.

17. The air suspension system as set forth in claim 1, wherein the first valve is a 4-port/2-position solenoid valve, allowing the air tank to be directly connected to the air drier when being switched to a first position, and allowing the air tank to be connected to the second line while allowing the air drier to be connected to the third line when being switched to a second position.

18. The air suspension system as set forth in claim 1, wherein the second valve is a 4-port/2-position solenoid valve, allowing the compressor to be directly connected to the air spring-opening/closing valve when being switched to a first position, and allowing the second line to be connected to the compressor while allowing the third line to be connected to the air spring-opening/closing valve when being switched to a second position.

* * * * *